United States Patent [19]

Vassallo et al.

[11] 4,059,072
[45] Nov. 22, 1977

[54] AUTOMATIC AQUARIUM LIGHTING AND FISH FEEDING DEVICE

[76] Inventors: Emmanuel Vassallo; Helen I. Vassallo, both of No. 8855 Wyandotte St., East, Windsor, Ontario, Canada

[21] Appl. No.: 692,130

[22] Filed: June 2, 1976

[51] Int. Cl.² .............................................. A01K 61/02
[52] U.S. Cl. .................................................. 119/51.13
[58] Field of Search .......................... 119/51.11–51.15, 119/5; 222/70, 252

[56] References Cited

U.S. PATENT DOCUMENTS

| | | | |
|---|---|---|---|
| 3,050,029 | 8/1962 | Appleton | 119/51.13 |
| 3,416,497 | 12/1968 | Riel | 119/51.11 |

*Primary Examiner*—Jay N. Eskovitz
*Attorney, Agent, or Firm*—Charles Krassov

[57] ABSTRACT

This invention consists of a device for automatic fish feeding, and lighting of aquariums. It consists of a plate which fits over the top of an aquarium. On its top the plate is equipped with a timer, the rotating face of which is provided at its rim with a rod extending at right-angles from said face, for a single feeding per day, or with two equally spaced rods for a double feeding per day. The said rods can also be attached to the "ON" tab of the timer. The rods engage a circular turntable in which are radially located consecutive pivoted scoops, which contain fish food, causing said container to rotate in a horizontal plane. A hole is provided in the plate under the path of the scoops so that when a scoop arrives over said hole, its open front end drops through said hole discharging the food into the water. The plate is also provided with slots for the passage of light into the aquarium; and an opening for manual feeding.

3 Claims, 4 Drawing Figures

U.S. Patent
Nov. 22, 1977
4,059,072
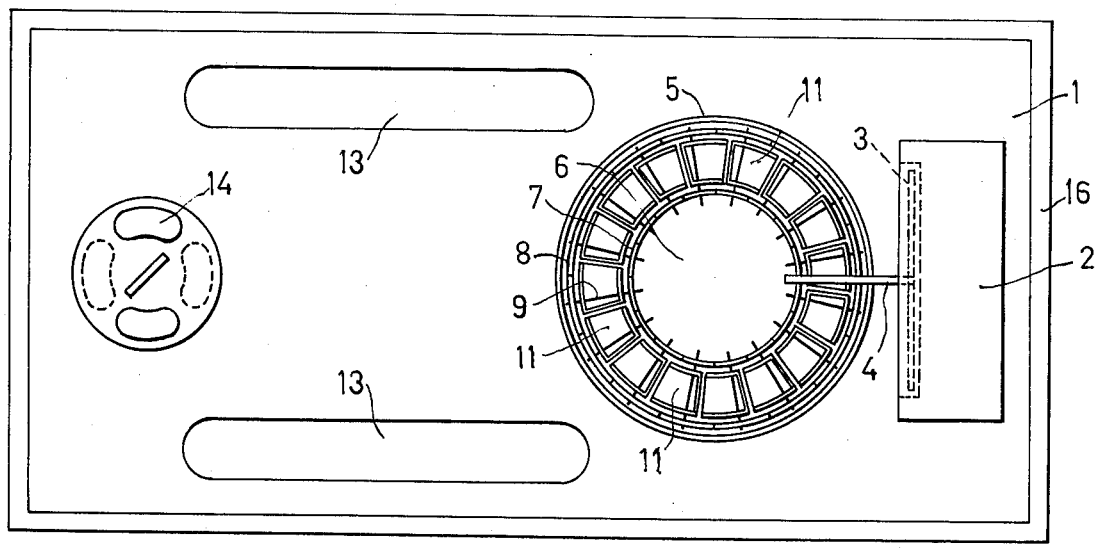
FIG. 1
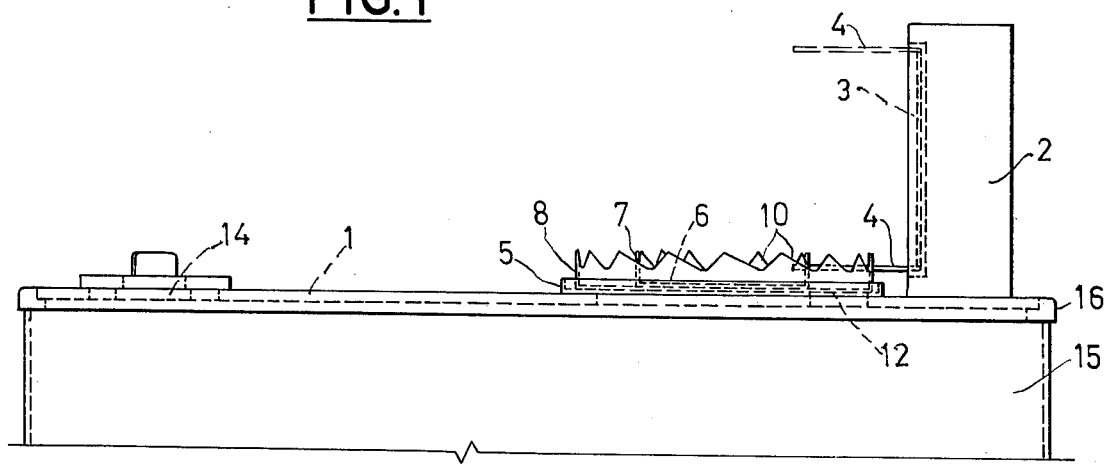
FIG. 2
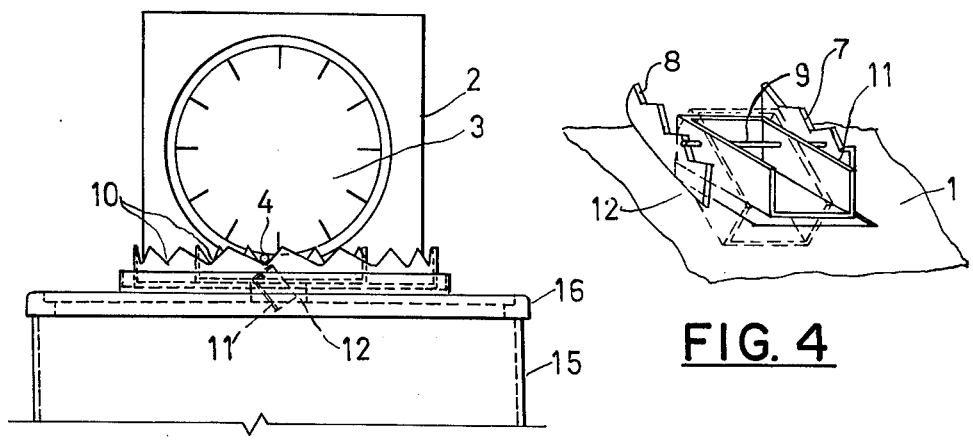
FIG. 3
FIG. 4

AUTOMATIC AQUARIUM LIGHTING AND FISH FEEDING DEVICE

This invention consists generally of an accessory for aquariums and particularly of a device for automatically lighting and supplying food to the contained fish.

Although this invention is suitable for use with almost any size of glass-walled aquariums, it is primarily intended for use with the glass-walled domestic type of aquariums which contain gold fish or other colorful tropical fish used as pets or for decorative purposes.

With the present tendency of a large number of people to live in apartment houses, in which pets such as dogs, cats, or any other animals are not permitted, the aquarium has become very popular as there does not appear to be any objection to fish as pets.

When the customary vacation period comes around and people are preparing to leave their homes for an extended period of time, the maintenance of the aquariums presents a problem.

The maintenance of aquariums consists of several essential requirements, such as providing an adequate supply of oxygen to the water, maintaining the proper temperature of the water, cleaning the water of toxic materials and parasites, and feeding of the aquarium fish. At the present time there are on the market a number of automatic devices which take care of all of the above requirements, except the fish feeding requirement. Thus the constant and continuous attention of any person has been eliminated, except in the case of the feeding operation in which the proper quantity and timing of the periodic food allotment is extremely important to the health, welfare, and life span of the fish.

The primary object of this invention is therefore to provide a device which will feed the aquarium fish automatically during the absence of any people for extended periods of time.

Another object of the invention is to provide light to the water in the aquarium when such light is required.

The above objects of the invention are accomplished by providing a timing device which automatically drops a predetermined quantity of food into the water at predetermined time intervales.

In describing the invention reference will be made to the attached drawings in which,-

FIG. 1, is a plan view of the invention,
FIG. 2, is a side elevation of the invention,
FIG. 3, is an end view of the invention, and
FIG. 4, is a isometric view of one of the invention's components.

In the drawings, the device is shown consisting of a flat rectangular plate 1 of any suitable material. The plate 1 is made in various sizes to fit the top of standard sized aquariums, or to fit the tops of custom built aquariums. Attached to the upper side of the plate 1, centrally located and at one end thereof is an electrically operated timer 2 the face 3 of which is divided into the usual number of hour and half hours. A special face 3 can be provided to the timer 2 to suit any specific timing division. One or more rods 4, the function of which is to activate the feeding mechanism, are removably attached to the face 3 and are spaced to correspond with the intervals between feedings. The rods 4 extend at right angles from the face 3.

The actual feeding mechanism is located on the plate 1, in front of the timer 2 and on the same center line with it. It consists of a shallow, circular container 5 which is fixed to the plate 1. A circular rotating inner turntable 6 rotates upon a center pin in the center of container 5 and has a peripheral wall 7. An outer ring 8 which is concentric with the wall 7 and of the same height, is joined to the wall 7 by a plurality of radially located, equally spaced pins 9 providing an open bottom space between the wall 6 and the ring 8. The upper edges of the wall 7 and the ring 8 are serrated with corresponding notches 10.

In the space between the wall 7 and the ring 8 are located a number of radially spaced consecutive scoops 11 which pivot upon the pins 9 at their upper rear ends. A hole 12 is provided through the container 5 and the plate 1 at one location in the space between the wall 7 and ring 8. The hole 12 is large enough for the passage therethrough of the discharge end of said scoops.

The plate 1 is also provided at each side thereof with a slot 13, above which a light, such as fluorescent lamp can be installed to illuminate the water in the aquarium; and a salt shaker type of opening 14, is provided anywhere in the plate 1 for manual feeding when the automatic feed is not required.

The operation of the automatic feeder is simple and foolproof. To start with, each scoop 11 is filled with a single feeding of food. As the face 3 of the timer 2 rotates clockwise in a vertical plane, each arm 4 engages the notches 10 causing the container 6 and the ring 8 to rotate in a horizontal plane in the direction of the enclosed backs of the scoops 11 so that when a scoop passes over the hole 12, its open front end drops through the hole 12, and the food is discharged into the water. For once a day feeding, one arm 4 is used; for twice a day feeding two equally spaced arms 4 are used. For once a day feeding, the aquarium can be left unattended by people for a period equal to the number of scoops in the device. For twice a day feeding the number of unattended days would be reduced to half of the number of scoops.

The normal settings of the timer 3 can be used to turn the lights on and off as required.

The device is shown located within the rim 16 of the aquarium 15.

The rod 4 can also be attached to the "ON" tab of the timer 3, so that whatever light is used to illuminate the aquarium will go on at about the same time food is discharged into the water of the aquarium.

The components of this invention lend themselves to various arrangements, in relation to each other, which may be called for in the manufacture of the device, without departing from the scope of the invention.

Having described the invention, what I claim is:

1. An automatic aquarium lighting and fish feeding device comprising in combination a flat plate of dimensions to fit the top of an aquarium; a timer of the type having a revolving face and "ON" and "OFF" tabs; at least one rod attached to said "ON" tab and at right angles to said rotating face; a circular turntable located in front of said timer, rotating on a center pin which is fixed to said plate; a wall attached to the periphery of the turntable provided with equally spaced notches in its upper edge by means of which the said timer rod engages the turntable to cause it to rotate; a ring of the same width as the turntable wall concentric with said turntable and spaced from it equipped with notches which correspond with those in the wall of the turntable also for engaging the timer rod; a plurality of equally and radially spaced pins which join the said ring to the wall of the turntable; a plurality of consecutive open end food carrying scoops located in the space between said ring and said turntable; the scoops being pivotally supported by the said radially spaced pins; a single hole through said plate located in the path of said scoops and just large enough to permit the passage through it the open end of a single pivoted scoop; openings in said plate for the passage of light to the aquarium water; and a cover equipped opening in the plate for alternative manual feeding.

2. A device such as described in claim 1, in which the timer rod is attached directly to the rotating face of the timer.

3. A device such as described in claim 2, in which the face of the timer is provided with more than one timer rod for the purpose of providing more than one feeding per day.

* * * * *